(12) United States Patent
Chung et al.

(10) Patent No.: US 12,473,088 B2
(45) Date of Patent: Nov. 18, 2025

(54) APPARATUS AND METHOD FOR LOADING AND UNLOADING CARGO OF AIR MOBILITY

(71) Applicants: Hyundai Motor Company, Seoul (KR); Kia Corporation, Seoul (KR)

(72) Inventors: Jae Hoon Chung, Seoul (KR); Jong Min Oh, Gyeonggi-do (KR); Ji A Lee, Seoul (KR); Ki Seok Sung, Gyeonggi-do (KR); Jong Kyu Choi, Gyeonggi-do (KR); Young Jun Byun, Seoul (KR); Kye Yoon Kim, Gyeonggi-do (KR); Ji Min Han, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 393 days.

(21) Appl. No.: 17/939,708

(22) Filed: Sep. 7, 2022

(65) Prior Publication Data
US 2023/0264816 A1    Aug. 24, 2023

(30) Foreign Application Priority Data
Feb. 24, 2022 (KR) ........................ 10-2022-0024561

(51) Int. Cl.
| | |
|---|---|
| *B64D 1/22* | (2006.01) |
| *B25J 15/00* | (2006.01) |
| *B25J 18/04* | (2006.01) |
| *B25J 18/06* | (2006.01) |
| *B65G 67/04* | (2006.01) |

(Continued)

(52) U.S. Cl.
CPC ............ *B64D 1/22* (2013.01); *B25J 15/0014* (2013.01); *B25J 18/04* (2013.01); *B25J 18/06* (2013.01);
(Continued)

(58) Field of Classification Search
CPC ......... B64D 1/22; B25J 15/0014; B25J 18/04; B65G 67/04; B65G 67/24;
(Continued)

(56) References Cited

U.S. PATENT DOCUMENTS 4,794,662 A * 1/1989 Parcher ................... F23J 3/026
15/249.1
10,599,138 B2   3/2020 Bosworth
(Continued)

FOREIGN PATENT DOCUMENTS

| CN | 109573035 A | 4/2019 |
|---|---|---|
| CN | 109661296 A | 4/2019 |

(Continued)

*Primary Examiner* — Saul Rodriguez
*Assistant Examiner* — Willie W Berry, Jr.
(74) *Attorney, Agent, or Firm* — Fox Rothschild LLP

(57) ABSTRACT

The present disclosure relates to an apparatus and method for loading and unloading cargo of air mobility, in which cargo loading and unloading may be automated without the aid of human resources, as well as enabling loading and unloading of cargo in a required location without an air mobility landing. The apparatus includes a winch installed in a cargo hold of an air mobility, a multiarticulated robot arm suspended from the winch, and a gripper provided on an end of the multiarticulated robot arm and capable of gripping a container.

14 Claims, 6 Drawing Sheets

(51) Int. Cl.
  *B65G 67/24* (2006.01)
  *B66C 1/06* (2006.01)
  *B66C 1/22* (2006.01)
  *B66C 1/30* (2006.01)
  *B66D 1/56* (2006.01)
(52) U.S. Cl.
  CPC ............ *B65G 67/04* (2013.01); *B65G 67/24* (2013.01); *B66C 1/06* (2013.01); *B66C 1/223* (2013.01); *B66C 1/30* (2013.01); *B66D 1/56* (2013.01); *B65G 2814/0398* (2013.01)
(58) Field of Classification Search
  CPC ... B65G 2814/0398; B66C 1/06; B66C 1/223; B66C 1/30; B66D 1/56; B66D 3/24
  See application file for complete search history.

(56) References Cited

U.S. PATENT DOCUMENTS

| | | | |
|---|---|---|---|
| 2017/0121022 A1* | 5/2017 | Zonio | B64D 1/22 |
| 2017/0267345 A1* | 9/2017 | Marom | B64D 1/12 |
| 2021/0070438 A1* | 3/2021 | Hoshide | B25J 9/1679 |
| 2021/0179265 A1* | 6/2021 | Yamato | B64D 1/22 |
| 2022/0119103 A1 | 4/2022 | Braun et al. | |

FOREIGN PATENT DOCUMENTS

| | | |
|---|---|---|
| JP | 2019-514785 A | 6/2019 |
| KR | 2017-0130140 A | 11/2017 |
| KR | 2019-0070448 A | 6/2019 |
| WO | 2017/192488 A1 | 11/2017 |

* cited by examiner

APPARATUS AND METHOD FOR LOADING AND UNLOADING CARGO OF AIR MOBILITY

CROSS-REFERENCE TO RELATED APPLICATION

This application is based on and claims the benefit under 35 USC 119(a) of Korean Patent Application No. 10-2022-0024561 filed on Feb. 24, 2022 in the Korean Intellectual Property Office, the entire disclosure of which is incorporated herein by reference for all purposes.

TECHNICAL FIELD

Embodiments of the present disclosure relate to an apparatus and method for loading and unloading cargo of an air mobility vehicle, in which cargo loading and unloading may be automated without the aid of human resources, as well as enabling loading and unloading of cargo in a required location without landing of an air mobility vehicle.

BACKGROUND

Various methods of transporting cargo using air mobility have been proposed. For example, along with drones for transporting small cargoes, a Cargo Unmanned Aerial System (CUAS) for transporting medium-sized cargoes is being developed. In this case, in order to transport cargo by such an air mobility, the cargo should be able to be safely and conveniently loaded into the cargo hold of the air mobility and, conversely, from the cargo hold to the ground.

Furthermore, in ships, islands, mountains, or remote areas where it is difficult to construct an air mobility landing site or there is no take-off and landing site, it is significantly difficult for an air mobility to land directly and to safely unload or load cargo.

As such, unlike advances in aviation technology, the development of apparatuses for loading and unloading cargo for an air mobility has been very slow, and the development of apparatuses capable of automatically and efficiently performing unloading cargo from an air mobility or loading cargo into an air mobility is in demand.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An exemplary embodiment of the present disclosure is to provide an apparatus and method for loading and unloading cargo of an air mobility system or vehicle, in which cargo loading and unloading may be automated without the assistance of human resources, as well as enabling loading and unloading of cargo in a required location without an air mobility landing. In one aspect, an apparatus for loading and unloading cargo is provided, the apparatus comprising 1) a winch configured to be installed in an air mobility vehicle and 2) a multiarticulated robot arm in communication with the winch and the robot arm comprising a gripper capable of gripping a container. In one embodiment, the winch may be configured to be installed in a cargo hold of an air mobility vehicle. In one embodiment, the robot arm may be suspended from the winch.

According to a further exemplary embodiment of the present disclosure, an apparatus for loading and unloading cargo includes a winch installed in a cargo hold of an air mobility vehicle; a multiarticulated robot arm suspended from the winch; and a gripper provided on an end of the multiarticulated robot arm and capable of gripping a container.

In certain aspects, the cargo hold may have a bottom plate capable of being opened to allow entry and exit of the container, and the winch may be fixed to a ceiling in a position corresponding to an opening of the bottom plate.

In certain aspects, the winch may include a drum configured to unwind or wind a wire, and a motor rotating the drum, and the wire may be connected to a support for coupling and supporting the multiarticulated robot arm.

In certain aspects, the winch may include a limit switch, and when the wire is wound, a controller may stop an operation of the winch as an upper surface of the support contacts the limit switch.

In certain aspects, the multiarticulated robot arm may include at least a six-axis multiarticulated robot arm or a flexible multiarticulated robot arm.

In certain aspects, the gripper may include a guide coupled to an end of the multiarticulated robot arm; a plurality of finger members, at least one of which reciprocates along the guide; and a driving unit connected to at least one reciprocating finger member and driving the finger member.

In certain aspects, the driving unit may include a motor capable of forward and reverse rotation and mounted on one side of the guide, a bolt shaft connected to the motor and rotated, and a nut portion engaged with the bolt shaft, and a reciprocating finger member may be fixedly connected to the nut portion.

In certain aspects, the apparatus for loading and unloading cargo may include a magnetic portion coupled to an end of the multiarticulated robot arm together with or instead of the gripper.

In certain aspects, an end of the multiarticulated robot arm or the gripper may be provided with an image sensor installed thereon, and the image sensor may be electrically connected to a controller.

In certain aspects, the apparatus for loading and unloading cargo may further include a load measuring unit sensing a load of the container, the load measuring unit may be electrically connected to a controller, and the load measuring unit may include a load sensor installed between an end of the multiarticulated robot arm and the gripper or a torque sensor installed on the winch.

In certain aspects, the apparatus for loading and unloading cargo may further include a transfer robot capable of loading the container thereon and movable on the ground, and a control unit of the transfer robot may be capable of communicating with a controller of the air mobility.

In certain aspects, on an upper plate of the transfer robot, a protrusion inserted into and coupled to a concave groove in a lower surface of the container may be formed.

According to an exemplary embodiment of the present disclosure, a method of loading and unloading cargo includes hovering an air mobility vehicle without landing when the air mobility vehicle arrives at a destination of cargo loading or unloading; moving a transfer robot toward the destination and positioning below the air mobility vehicle; communicating between a control unit of the transfer robot and a controller of the air mobility vehicle; descending a multiarticulated robot arm and a gripper from a cargo hold of the air mobility vehicle; and detecting a positional deviation between the gripper and the transfer robot, and correcting the positional deviation.

In the correcting of the positional deviation, the positional deviation between the gripper and the transfer robot may be detected by an image sensor, and the multiarticulated robot arm may be operated or the transfer robot may be moved through communication as much as the detected positional deviation.

The method of loading and unloading cargo may further include, when unloading a container from the air mobility vehicle or system to the transfer robot, operating the multiarticulated robot arm to move the gripper toward the container to be unloaded; operating the gripper to grip the container; moving, by the multiarticulated robot arm, the gripper and the container toward a door of the cargo hold; and operating a winch after the door is opened, and lowering the multiarticulated robot arm, the gripper, and the container to an outside of the air mobility vehicle through an open opening of the cargo hold.

The method of loading and unloading cargo may further include monitoring a load applied to the multiarticulated robot arm or the winch and determining that the container is seated on the transfer robot; and actuating the gripper to release a grip on the container.

When the container is unloaded from the air mobility vehicle or system to the transfer robot, the container may be disposed on an upper plate of the transfer robot while descending, and a protrusion formed on the upper plate of the transfer robot may be inserted into a concave groove of the container.

The method of loading and unloading cargo may further include, when loading a container from the transfer robot to the air mobility vehicle or system, operating a winch after a door of the cargo hold is opened, and lowering the multiarticulated robot arm and the gripper to an outside of the air mobility vehicle or system through an open opening of the cargo hold; monitoring a load applied to the multiarticulated robot arm or the winch, and determining that the gripper touches the container on the transfer robot; and operating the gripper to grip the container.

The method of loading and unloading cargo may further include, when loading a container from the transfer robot to the air mobility, lifting the multiarticulated robot arm, the gripper, and the container into the air mobility through an open opening of the cargo hold by operating a winch after the gripper grips the container on the transfer robot; stopping an operation of the winch when a wire of the winch is completely wound up; after a door of the cargo hold is closed, operating the multiarticulated robot arm to move the gripper and the container toward a position on which the container is to be loaded; operating the gripper and releasing a grip on the container; and returning the multiarticulated robot arm and the gripper to original positions.

When the winch is operated to lift the multiarticulated robot arm, the gripper, and the container into an interior of the air mobility, a load of the container may be detected or calculated, and the multiarticulated robot arm may move the gripper and the container to be arranged according to the load of the container on a bottom plate in the cargo hold.

As discussed, the method and system suitably include use of a controller or processor.

In another embodiment, an air mobility is provided that comprise an apparatus as disclosed herein. For instance, an air mobility vehicle is provided that comprises an apparatus for loading and unloading cargo, the apparatus comprising 1) a winch installed in the air mobility vehicle and 2) a multiarticulated robot arm in communication with the winch and the robot arm comprising a gripper capable of gripping a container. In one embodiment, the winch may be configured to be installed in a cargo hold of an air mobility vehicle. In one embodiment, the robot arm may be suspended from the winch.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
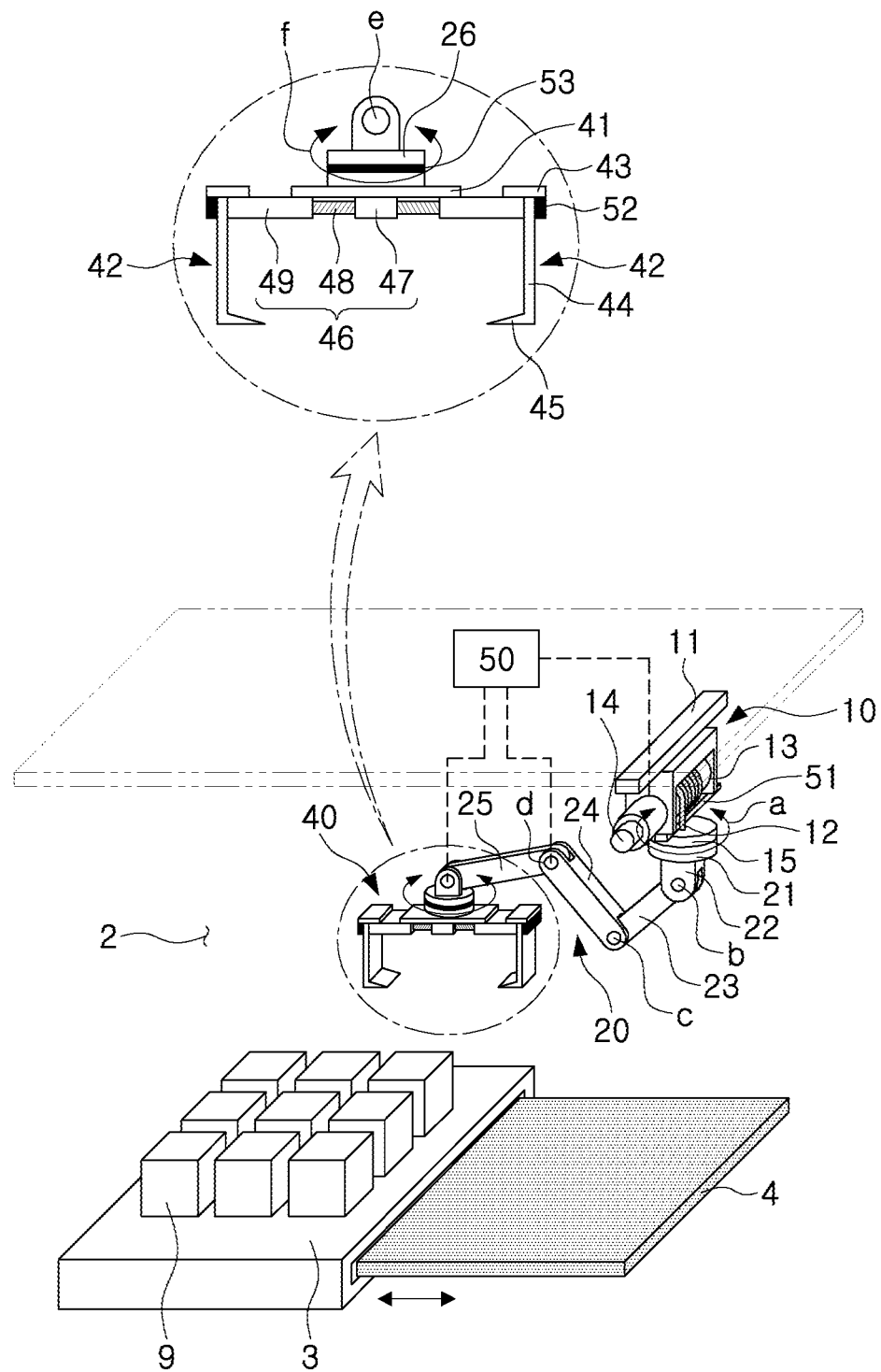
FIG. 1 is a perspective view illustrating an apparatus for loading and unloading cargo of an air mobility according to an exemplary embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided and thus, this disclosure will be thorough and complete, and will fully convey the scope of the present disclosure to one of ordinary skill in the art.

Herein, it is noted that use of the term "may" with respect to an exemplary embodiment or example, e.g., as to what an exemplary embodiment or example may include or implement, means that at least an exemplary embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the present disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Due to manufacturing techniques and/or tolerances, variations of the shapes illustrated in the drawings may occur. Thus, the examples described herein are not limited to the detailed shapes illustrated in the drawings, but include changes in shape occurring during manufacturing.

The features of the examples described herein may be combined in various manners as will be apparent after gaining an understanding of the present disclosure of this application. Further, although the examples described herein have a variety of configurations, other configurations are possible as will be apparent after gaining an understanding of the present disclosure of this application.

The drawings may not be to scale, and the relative sizes, proportions, and depiction of elements in the drawings may be exaggerated for clarity, illustration, and convenience.

FIG. 1 is a perspective view illustrating an apparatus for loading and unloading cargo of an air mobility according to an exemplary embodiment.

As an air mobility vehicle or system 1 to which an apparatus for loading and unloading cargo according to an exemplary embodiment may be applied, for example, a CUAS (Cargo Unmanned Aerial System) capable of vertical take-off and landing and having a cargo hold 2 may be adopted. Such CUAS may be used in the field of high-speed transportation of medium-sized cargo between cities. However, the example of the air mobility is not limited to CUAS, and various manned or unmanned aerial vehicles may be applied.

The air mobility vehicle or system 1 may include a plurality of wings 6 or a plurality of rotors provided on a fuselage. For example, the plurality of rotors may be provided for vertical take-off and landing and horizontal flight of the fuselage.

The cargo hold 2 may be provided with a space in which cargo may be loaded. The cargo hold may accommodate a container 9 into which the cargo is disposed, and for example, a bottom plate 3 of the cargo hold may be opened to allow the container to enter and exit.

To this end, a door 4 may be installed on the bottom plate 3 of the cargo hold 2 with the formation of an opening. As the door, a sliding door that opens and closes in the longitudinal direction of the air mobility may be employed. However, the type and arrangement of the door are not limited thereto, and for example, a door that opens and closes upwardly and downwardly may be used.

The bottom plate 3 of the cargo hold 2 may support the container 9 in an area other than the opening. The apparatus for loading and unloading cargo according to an exemplary embodiment may be disposed on a ceiling 5 of the cargo hold. However, the arrangement of the apparatus for loading and unloading cargo is not limited to the ceiling of the cargo hold.

The apparatus for loading and unloading cargo of an air mobility vehicle or system according to an exemplary embodiment may include a winch 10, a multiarticulated robot arm 20, and a gripper 40.

The winch 10 may be fixedly disposed on, for example, the ceiling 5 of the cargo hold 2 of the air mobility vehicle or system 1 via a support bracket 11 as a medium. In this case, the winch may be fixed to the ceiling at a position corresponding to the opening of the bottom plate 3.

However, the arrangement of the winch 10 is not limited to the above-described example, and for example, a rail (not illustrated) is installed on the ceiling of the cargo hold in the longitudinal direction of the air mobility, and the winch may be disposed on a trolley movable along the rail. Accordingly, the position of the winch may be varied in the longitudinal direction of the air mobility by the movement of the trolley.

Alternatively, for example, a pivotable support frame (not illustrated) may be installed on the sidewall of the cargo hold, and the winch 10 may be disposed on the support frame. Thereby, the position of the winch may be varied within the cargo hold of the air mobility by the turning of the support frame.

The winch 10 may include a drum 13 for unwinding or winding a wire 12, and a motor 14 to rotate the drum to unwind or wind the wire. A support 15 for coupling and supporting the multiarticulated robot arm 20 is connected to the wire, and the multiarticulated robot arm may be installed hanging from the wire. The support may be formed in the form of a flat plate or a block.

Accordingly, as the motor 14 of the winch 10 operates, the drum 13 rotates, and due to the rotation of the drum, the wire 12 is unwound from the drum or wound around the drum, and thereby, the multiarticulated robot arm 20 connected to the wire may descend or ascend.

For example, when the wire 12 of the winch 10 is unwound from the drum 13 to a maximum length thereof, the wire may extend approximately from several meters to several tens of meters. The control of the winch may be performed by a controller 50 electrically connected to the motor 14 of the winch.

When the wire 12 is fully wound up, a signal may be generated as the upper surface of the support 15 contacts a limit switch 51 installed on the lower surface of a case of the winch 10, and the controller 50 electrically connected to the limit switch may detect this signal to stop the operation of the winch and terminate the winding of the wire.

More stably, to sufficiently support the multiarticulated robot arm 20 and the gripper 40 and to significantly reduce the shaking of the multiarticulated robot arm and the gripper, a plurality of winches 10 may be installed in the cargo hold 2, and the wire 12 of each winch may be connected to a single support. Optionally, distributing the load by disposing a plurality of pulleys between the drum 13 of the winch and the multiarticulated robot arm may be used.

The multiarticulated robot arm 20 may be installed hanging from the wire 12 of the winch 10 via the support 15.

As an exemplary embodiment of the multiarticulated robot arm 20, a multiarticulated robot arm of at least 6 axes may be employed. For example, the multiarticulated robot arm may include a body 21, a shoulder 22, a first arm member 23, a second arm member 24, a third arm member 25, and a wrist 26.

Components such as a motor and a speed reducer may be accommodated in the body 21, and the motor may be electrically connected to the controller 50.

The shoulder 22 may be rotatable with respect to the body 21 in the direction of the arrow (a) based on the vertical direction. The rotation of the shoulder may be implemented by the motor, the speed reducer, and the like in the body.

The first arm member 23 may be bendable with respect to the shoulder 22 with a point b as a hinge axis. The hinge axis may be connected to a motor, and the motor may be electrically connected to the controller 50.

The second arm member 24 may be bendable with respect to the first arm member 23 with a point c as a hinge axis. The hinge axis may be connected to a motor, and the motor may be electrically connected to the controller 50.

The third arm member 25 may be bendable with respect to the second arm member 24 with a point d as a hinge axis. The hinge axis may be connected to a motor, and the motor may be electrically connected to the controller 50.

The wrist 26 may be bendable with respect to the third arm member 25 in a state in which the gripper 40 is installed with a point e as a hinge axis. At the same time, the wrist may rotate in the direction of the arrow f about the direction perpendicular to the hinge axis of the point e. This wrist constitutes the end of the multiarticulated robot arm 20.

The hinge axis may be connected to a motor, and the motor may be electrically connected to the controller 50. In addition, components such as a motor and a speed reducer may be accommodated in the wrist 26, and the motor in the wrist may be electrically connected to the controller 50. The rotation of the wrist may be performed by a motor, a speed reducer, and the like in the wrist.

The gripper 40 may include a guide 41, a plurality of finger members 42, and a driving unit 46.

The guide 41 may be coupled to the end of the multiarticulated robot arm 20 to support the plurality of finger members 42 and the driving unit 46.

At least one of the plurality of finger members 42 may reciprocate along the guide 41. The drawing illustrates an example in which both finger members are configured as movable finger members capable of reciprocating movement, and it is mainly described with this example, but the present disclosure is not limited thereto. For example, one side may be configured as a movable finger member, and the other side may be configured as a fixed finger member.

Each finger member 42 may include a coupling portion 43 connected to the driving unit 46, an extension 44 extending at right angles to the coupling portion, and a hooking portion 45 formed by bending the end of the extension.

The driving unit 46 may include a motor 47 that is capable of forward and reverse rotation and is mounted on one side of the guide 41, a bolt shaft 48 connected to the motor and rotated and having double threads in opposite directions, and a pair of nut portions 49 engaged with the bolt shaft. The coupling portion 43 of the corresponding finger member 42 may be fixedly connected to each nut portion.

The driving unit 46 may be configured as, for example, a hydraulic cylinder or the like, but in this case, if the fluid applying pressure leaks from the driving unit, the finger member 42 cannot be fixed while holding the container 9 during transport, and there is a high risk of dropping the container and the cargo therein.

On the other hand, in the case of the driving unit 46 including the motor 47, the bolt shaft 48 and the nut portion 49, even when the power is cut off due to a malfunction, or the like, the finger member 42 may be fixed in the state immediately before power cut off, and thus, there is an advantage in which there is no risk of the container 9 falling down during transport.

In the gripper 40 configured as described above, the position of the at least one finger member 42 may be changed according to the rotation of the bolt shaft 48. The movable finger member may reciprocate along the plane of the guide 41.

In addition, in the gripper 40 in which the finger members 42 on both sides are both movable finger members, since both nut portions 49 and both finger members may be moved simultaneously by the rotation of the motor 47, both finger members may be controlled and operated to be symmetrical with respect to the center of gravity of the gripper.

The gripper 40 may grip the container 9 (for example, a hexahedral-shaped box) in which cargos of various sizes are accommodated, and may load or unload the container 9 in and out of the air mobility 1.

An apparatus for loading and unloading cargo of an air mobility according to an exemplary embodiment may include a magnetic portion 30 (refer to FIG. 2) coupled to the end of the multiarticulated robot arm 20, together with or instead of the gripper 40.

The magnetic portion 30 may include a permanent magnet or an electromagnet that generates attractive force when power is applied and magnetized. The electromagnet is excited when power is applied under the control of the controller 50, and loses magnetic force when the power is cut off.

The magnetic portion 30 may be attached to the container 9 formed of a magnetic material by strong magnetic force.

As a result, the multiarticulated robot arm 20 may hold the container through the magnetic portion as a medium, or may be attached to and in contact with the container to move the container stably.

The magnetic portion 30 may be mounted to the end of the multiarticulated robot arm 20 by, for example, bolting or a hook. When the magnetic portion is used together with the gripper 40, the magnetic portion may have a size and shape that do not interfere with the operation of the finger member 42, and may be firmly fixed and mounted to the guide 41 or the finger member 42.

Additionally, an image sensor 52 may be installed on the end of the multiarticulated robot arm 20, or on the gripper 40, and the image sensor may detect a situation around the multiarticulated robot arm or a situation around the air mobility when the multiarticulated robot arm is drawn out of the air mobility vehicle or system. The image sensor may be electrically connected to the controller 50, and in addition, an illumination light for the image sensor is provided to irradiate light to the sensing area of the image sensor.

On the other hand, when loading the cargo on the air mobility 1, since the center of gravity of the entire air mobility vehicle or system is shifted by the center of gravity of the cargo, balancing the center of gravity may be essential for efficient and safe flight.

To this end, the apparatus for loading and unloading cargo of an air mobility vehicle or system according to an exemplary embodiment may include a load measuring unit 53 for sensing the weight of the container 9, that is, the load. The load measuring unit may include a load sensor installed between the end of the multiarticulated robot arm 20 and the gripper 40 or a torque sensor installed on the winch 10. The load measuring unit may be electrically connected to the controller 50.

The load sensor or torque sensor of the load measuring unit 53 may sense the load or torque applied to the multiarticulated robot arm 20 or the winch 10 by the container 9 and transmits the same to the controller 50. The controller may monitor or calculate the load of the container based on the detection signal.

The controller 50 may control the operation of the winch 10, the multiarticulated robot arm 20, and the gripper 40 according to a detection signal related to the load of the container 9 received from the load measuring unit 53, and a detection signal related to the position of the container 9 in the cargo hold 2 or outside the air mobility vehicle or system 1 and received from the image sensor 52. The controller may be electrically connected to the motor 14 of the winch, the motors of the multiarticulated robot arm, the motor 47 of the gripper, and the like through wired or wireless communication.

The controller 50 may receive a detection signal related to the load and a detection signal related to the position of the container 9 in real time, and may transmit a command signal to the motor 14 of the winch 10, the motors of the multiarticulated robot arm 20, the motor 47 of the gripper 40, and the magnetic portion 30 formed of an electromagnet, or the like according to the received information and the set control logic, such that the apparatus for loading and unloading cargo may automatically perform loading, gripping or attaching, and unloading of the container.

The controller 50 may be implemented with various processing devices such as a microprocessor in which a semiconductor chip or the like capable of performing various operations or commands is embedded, and may control the overall operation of the apparatus for loading and unloading cargo according to an exemplary embodiment.

For example, the controller 50 may be incorporated into a control system of the air mobility vehicle or system 1 or used in combination therewith.

Accordingly, the controller 50 may arrange the containers according to the load on the bottom plate 3 by using the apparatus for loading and unloading cargo when the plurality of containers 9 are loaded in the cargo hold 2.

Since various techniques for calculating or estimating the center of gravity have been proposed and known, a detailed description thereof will be omitted in this specification.

Since an apparatus for loading and unloading cargo of an air mobility according to an exemplary embodiment may properly arrange the container 9 in the cargo hold 2 of the air mobility vehicle or system 1 or may adjust the position thereof by using the multiarticulated robot arm 20 and the gripper 40, the advantage of unloading containers disposed in relatively inward side of the cargo hold, irrespective of the loading order, may be obtained.

Figure 2:
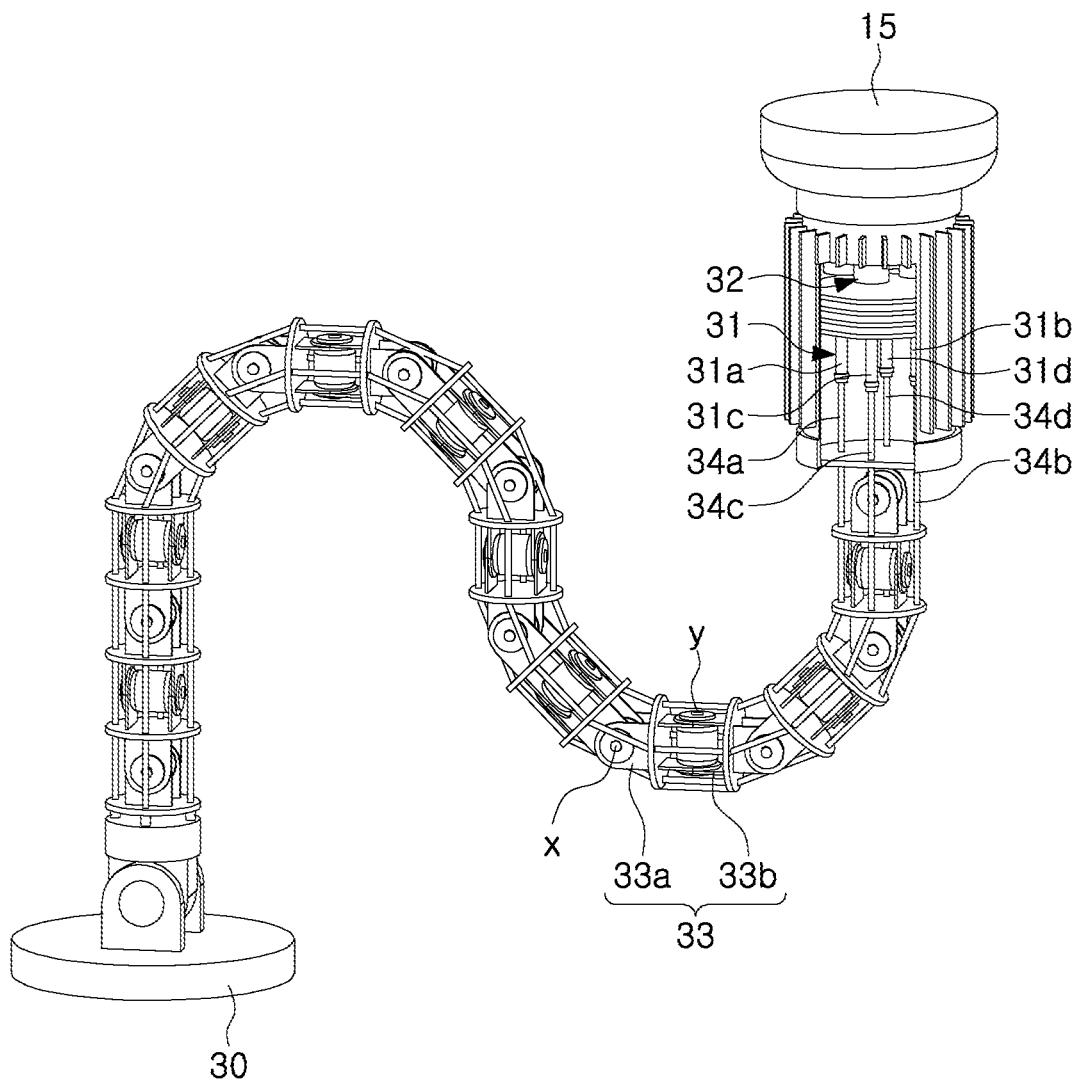
FIG. 2 is a perspective view illustrating another embodiment of a multiarticulated robot arm.

FIG. 2 is a perspective view illustrating another embodiment of the multiarticulated robot arm.

In another embodiment of the multiarticulated robot arm 20, a flexible type of multiarticulated robot arm may be employed. For example, the multiarticulated robot arm may include a plurality of push rods 31, a driving module 32, a plurality of rotary joints 33, and a plurality of connecting wires 34.

The push rod 31 may include a first push rod 31*a*, a second push rod 31*b*, a third push rod 31*c*, and a fourth push rod 31*d*, and may respectively correspond and be connected to the connecting wire 34.

The driving module 32 for each push rod 31 may be comprised of a motor, a speed reducer, and a screw nut. A position sensor capable of detecting the movement amount of the push rod, and an encoder capable of detecting the rotation speed of the motor, may be further installed on the push rod, to detect the operation accuracy of the push rod.

Thereby, the amount of movement of the push rod 31 may be precisely controlled, and furthermore, the rotation angle of the rotary joint 33 may be precisely controlled.

The plurality of rotary joints 33 may be provided as a plurality of longitudinal rotary joints 33*a* and a plurality of transverse rotary joints 33*b* are alternately connected. The longitudinal rotary joint and the transverse rotary joint may have the same structure as each other, and only needs to satisfy the condition that the rotating shafts to be mounted are perpendicular to each other.

The connecting wire 34 may include a first connecting wire 34*a*, a second connecting wire 34*b*, a third connecting wire 34*c*, and a fourth connecting wire 34*d*. The first connecting wire 34*a* connected to the first push rod 31*a* and the second connecting wire 34*b* connected to the second push rod 31*b* control the longitudinal rotary joint 33*a*. The longitudinal rotary joint may be rotated by using an x point as the axis of rotation. The third connecting wire 34*c* connected to the third push rod 31*c* and the fourth connecting wire 34*d* connected to the fourth push rod 31*d* control the transverse rotary joint 33*b*. The transverse rotary joint may be rotated by using a y-point as a rotation axis.

Each push rod 31 may provide power to each connecting wire 34, and the amount of movement that the push rod pushes the connecting wire forward and pulls the connecting wire back may be converted into a rotation angle of each rotary joint 33 by controlling the tension and relaxation of the connecting wire.

For example, when the multiarticulated robot arm 20 wants to implement an upward swing to one side, the first push rod 31*a* may pull the first connecting wire 34*a* back to be tense, and the second push rod 31*b* may move forward such that the second connecting wire 34*b* is relaxed forward. The third connecting wire 34*c* and the fourth connecting wire 34*d* may not be moved and maintain a stationary state.

Since the first connecting wire 34*a* is tensioned back and at the same time the second connecting wire 34*b* is relaxed forward, the end of the multiarticulated robot arm may be pulled upwards by rotating the longitudinal rotary joint 33*a* by the cooperation of the first connecting wire and the second connecting wire.

The swing angle may be controlled through tension and relaxation of the connecting wire 34, and if the rotary joint 33 is braked when the swing angle reaches a required angle, the upward swing motion of the multiarticulated robot arm may be completed.

If necessary, the rotary joint 33 may include a brake, and for example, a brake of a power-off braking type by electromagnetism may be adopted. In the brake of this power-off braking type, when the current is cut off, the rotating shaft cannot rotate, and the rotary joint becomes a non-rotatable braking state, and when an electric current flows, the mechanical engagement of the brake is released and the rotary joint may rotate.

An example of a rotary joint and a brake is described in Korean Patent Application Laid-Open No. 2018-0010943, and the technology of such a rotary joint and brake may be cited and incorporated herein by reference.

Only a portion of the rotary joints 33 in the same rotational direction at respective control time points may perform rotational motion, and the remaining rotary joints in the same rotational direction may be braked by a brake. In this manner, a portion of the plurality of push rods and a portion of the plurality of rotary joints are controlled to operate, thereby implementing the multiarticulated robot arm having a mode of operation in a meandering form as illustrated in the drawings.

In this flexible type of multiarticulated robot arm, since the motor required for each joint may be omitted, modular design may be facilitated, the structure is compact, and the compatibility is relatively excellent. Therefore, costs of manufacturing and maintenance may be reduced, and the high degree of freedom allows the application range to be expanded.

In addition, the flexible type of articulated robot arm may reach an optimal posture by changing rotation angle itself, and may thus be adaptable to various work tasks and changes in the surrounding environment. For example, there is an advantage in that the work may be performed in a relatively narrow space, such as the cargo hold 2 of the air mobility vehicle or system 1.

The flexible type of multiarticulated robot arm is not limited to the above example, and a multiarticulated robot arm having any other arbitrary configuration may be employed. For example, a multiarticulated robot arm including a pneumatic bellows segment and a rotary drive may be employed instead of the connecting wire.

The aforementioned gripper 40 may be mounted on an end of the multiarticulated robot arm 20. In addition, the magnetic portion 30 may be coupled to the end of the multiarticulated robot arm together with or instead of the gripper.

FIGS. 3A to 3D are views illustrating a process of unloading a container from an air mobility vehicle or system to a transfer robot in a method of loading and unloading cargo according to an exemplary embodiment.

In the case of an apparatus for loading and unloading cargo of an air mobility according to an exemplary embodiment, when unloading cargo from the air mobility vehicle or system 1, cargo may be unloaded to the ground while hovering without the air mobility landing in places in which it is difficult to build a take-off and landing site for an air mobility or where there is no take-off and landing area.

Optionally, the apparatus for loading and unloading cargo of an air mobility according to an exemplary embodiment may further include a transfer robot 60 movable on the ground with loading the container 9 thereon.

The transfer robot 60 may be capable of autonomous driving. To this end, in the transfer robot, the traveling direction, the traveling speed, the turning direction, the turning speed, the stop position, the raising/lowering, the emergency stop, and the like may be controlled by a control unit. For the control of such autonomous driving, the transfer robot may be equipped with a battery and various sensors (not illustrated).

The transfer robot 60 may move to the corresponding place by matching the received location information to the map stored in a control unit and then finding a place to which the air mobility vehicle or system 1 will approach such that the control unit controls and operates a driving unit 61.

Since technologies related to such autonomous driving and navigation are being variously proposed in the field of transfer robots and departs from the main gist of the present disclosure, detailed description thereof will be omitted herein.

However, in order for the transfer robot 60 to receive and load the container 9 into which the cargo is disposed from the air mobility vehicle or system 1, or to load the container from the transfer robot to the air mobility, the control unit of the transfer robot that controls the transfer robot to approach to below the air mobility may communicate with the control system or external server to receive target location information from the control system or external server, or conversely to transmit location information thereof to the control system.

In addition, when the distance between the air mobility vehicle or system 1 and the transfer robot 60 is close, the control unit of the transfer robot 60 may communicate with the controller 50 of the air mobility through a local area network. The controller of the air mobility may transmit a signal to the control unit of the transfer robot to control the position, posture, height, or the like of the transfer robot by the local area network.

In this case, as the local area network, a communication network such as Radio Frequency Identification (RFID), a beacon, Bluetooth or the like may be used, but is not limited thereto. For example, any other communication network may be used.

An upper plate 62 of the transfer robot 60 may have an overall flat shape, and the upper plate may act as a loading area for a container (e.g., a hexahedral box) in which cargos of various sizes are disposed.

The transfer robot 60 itself or the upper plate 62 of the transfer robot may be formed to be liftable, so that the container may be raised or lowered to an appropriate height when unloading the container 9 from the air mobility vehicle or system 1 to the transfer robot or loading the container 9 from the transfer robot into the air mobility vehicle or system.

On the upper plate 62 of the transfer robot 60, for example, a protrusion 63 may be formed to be inserted into and coupled to a concave groove (not illustrated) in the lower surface of the container 9. The protrusion protrudes upwardly from the upper plate, and may be shape-fitted with the concave groove of the container.

Due to the upper plate 62 having the flat shape and the protrusion 63, the container 9 in which the cargo is disposed may be stably loaded on the transfer robot 60 and moved.

Figure 3A:
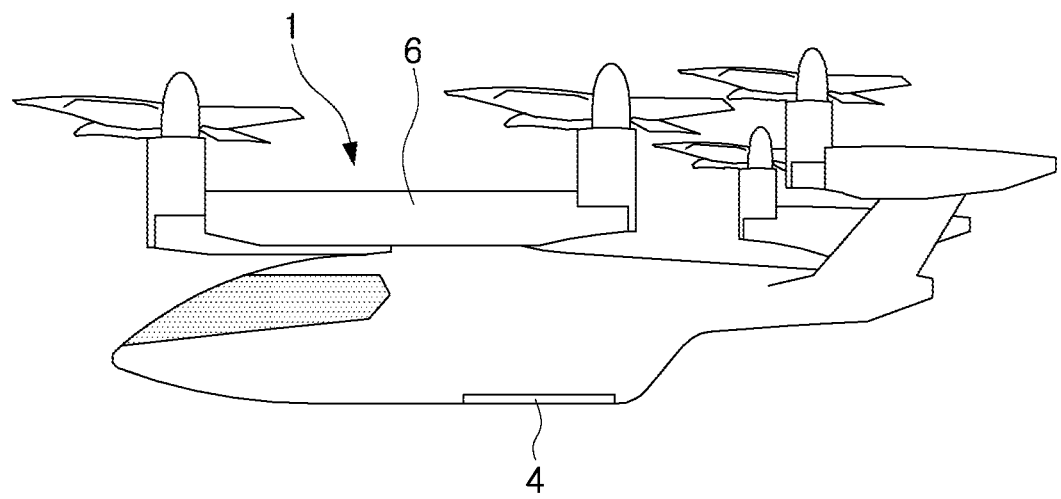
FIGS. 3A to 3D are diagrams illustrating a process of unloading a container from an air mobility to a transfer robot in a method of loading and unloading cargo according to an exemplary embodiment.
Figure 3A:
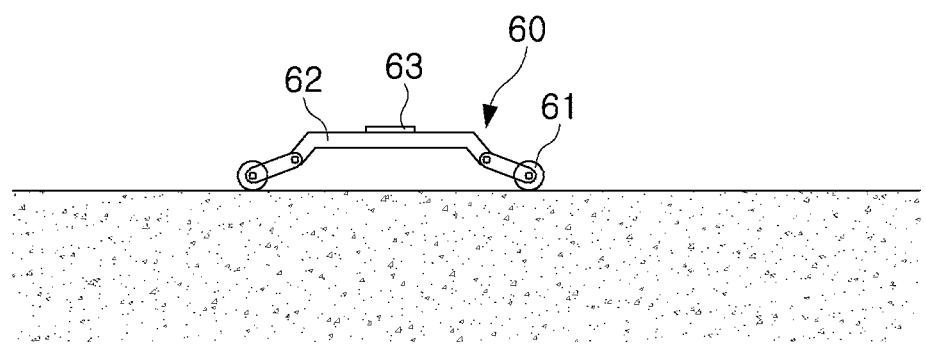

As illustrated in FIG. 3A, the air mobility 1 carrying the cargo accommodated in the container 9 may fly and move to near the destination of cargo unloading. The controller 50 of the air mobility may transmit the location information of the air mobility to the control system through communication.

When the control system checks the location information of the air mobility 1 and determines that the air mobility has reached near the destination of cargo unloading, the control system may send a command signal to the transfer robot 60 such that the transfer robot may be activated. Accordingly, the transfer robot with the upper plate 62 empty may autonomously drive and move toward the destination of cargo unloading.

When the air mobility vehicle or system 1 arrives at the destination of cargo unloading, the air mobility 1 may hover without landing and remains in the air of the destination. The transfer robot 60 that has reached the destination may be located below the air mobility.

In the cargo hold 2 of the air mobility vehicle or system 1, the multiarticulated robot arm 20 may be operated under the control of the controller 50 to cause the gripper 40 to move toward the container 9 to be unloaded. After the gripper is operated under the control of the controller to grip the container, the multiarticulated robot arm may move the gripper and the container toward the door 4 of the cargo hold.

After the door 4 is opened, the controller 50 of the air mobility 1 may transmit a signal to the control unit of the transfer robot through a local area network such that the transfer robot 60 adjusts the position and posture thereof.

In addition, the controller 50 of the air mobility vehicle or system 1 may detect the situation in the vicinity of the air mobility and determine the position of the transfer robot 60 by the multiarticulated robot arm 20 exposed externally through the open opening of the cargo hold 2 or the image sensor 52 of the gripper 40.

Figure 3B:
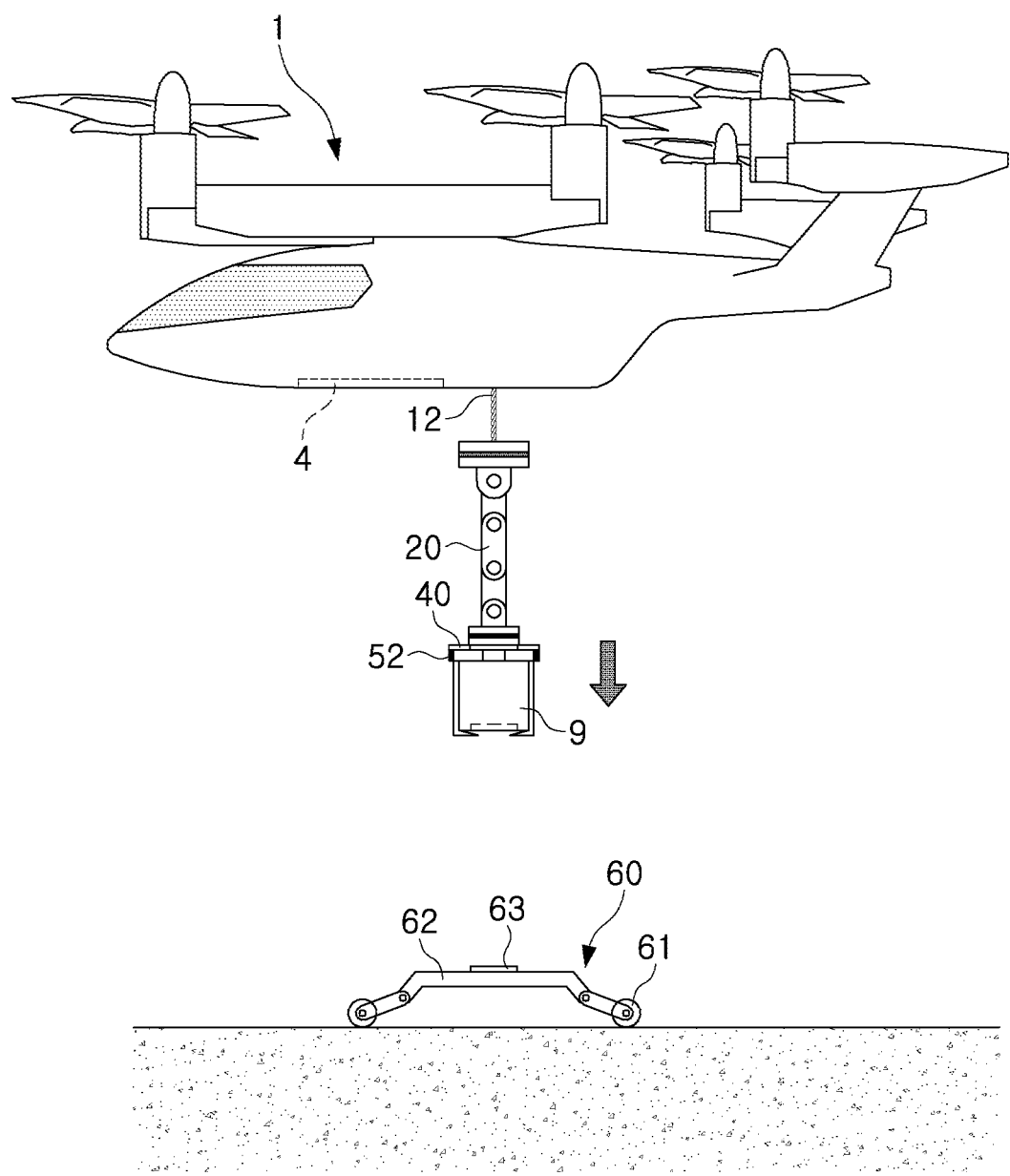

As illustrated in FIG. 3B, after the position of the transfer robot 60 is confirmed, the winch 10 may be operated under the control of the controller 50, and may lower the multiarticulated robot arm 20, the gripper 40, and the container 9 to the outside of the air mobility vehicle or system 1 through the open opening of the cargo hold, that is, to below the air mobility.

In detail, by operating the motor 14 of the winch 10, the drum 13 may be rotated, and the wire 12 may be released from the drum due to the rotation of the drum, such that the multiarticulated robot arm 20 connected to the wire, the gripper 40, and the container 9 may descend together.

For example, in the case in which the alignment between the container 9 and the transfer robot 60 is misaligned due to the movement of the air mobility vehicle or system 1 or weather conditions such as wind or the like, the controller 50 of the air mobility may detect the positional deviation between the gripper 40 and the transfer robot 60 by the image sensor 52 in real time, and operate the multiarticulated robot arm 20 by the position deviation to correct the position deviation, or may transmit a signal to the control unit of the transfer robot through a local area network such that the transfer robot moves and adjusts position and posture thereof.

Figure 3C:
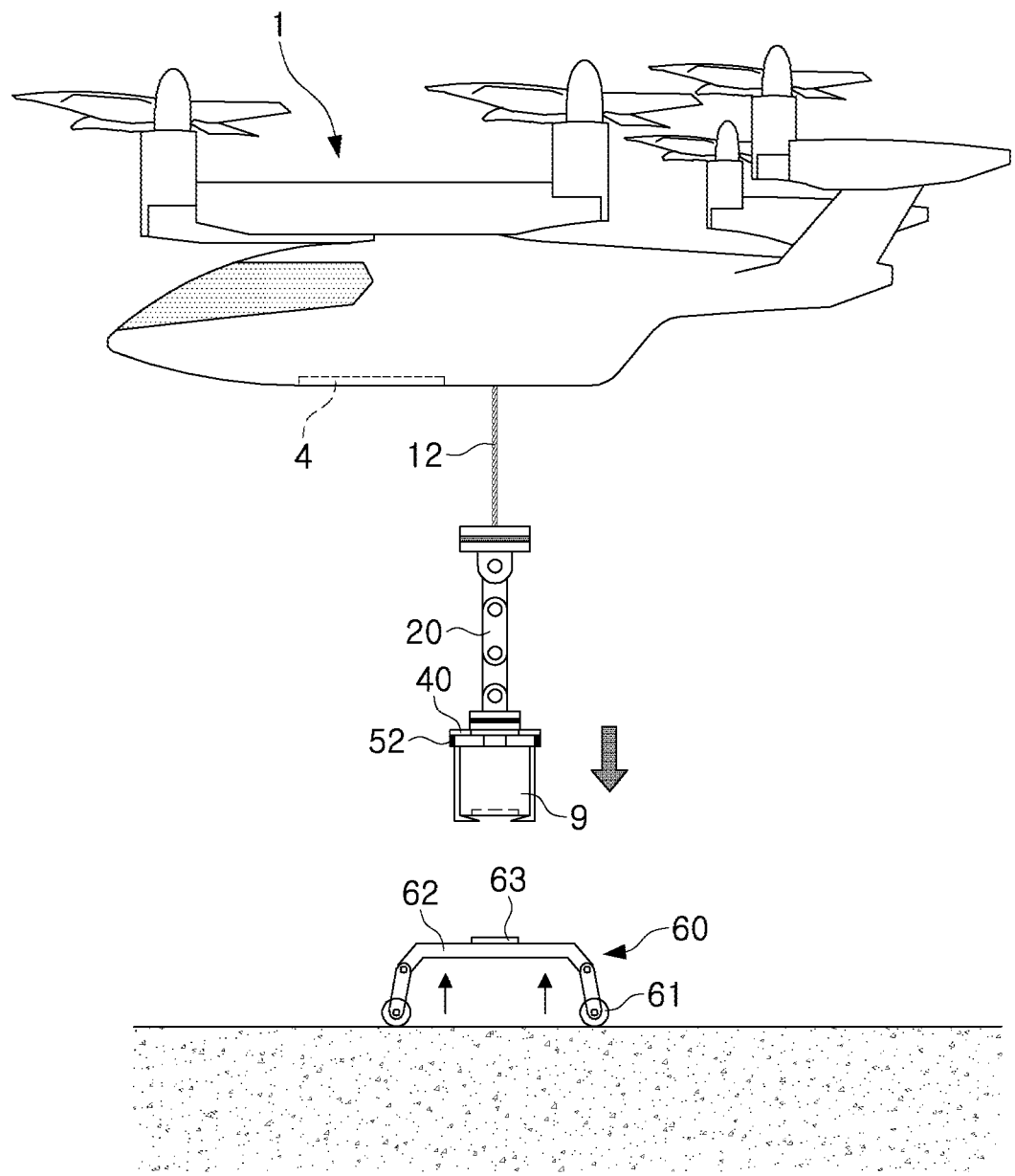

As illustrated in FIG. 3C, when the lowering of the container 9 together with the multiarticulated robot arm 20 and the gripper 40 is made below a certain level, the controller 50 of the air mobility vehicle or system 1 may transmit a signal to the control unit of the transfer robot through a local area network such that the transfer robot 60 adjusts the height. Accordingly, the transfer robot is controlled by the control unit such that the transfer robot itself or the upper plate 62 of the transfer robot ascends, and may be prepared to receive containers from air mobility.

When the container 9 is lowered by the apparatus for loading and unloading cargo from the air mobility 1 and is disposed on the upper plate 62 of the transfer robot 60, since the alignment between the gripper 40 and the transfer robot 60 is detected in real time by the image sensor 52, the protrusion 63 formed on the upper plate of the transfer robot may be automatically shape-fitted and inserted into the concave groove of the container.

Due to the upper plate 62 having a flat shape and the protrusion 63, the container 9 may be stably loaded on the transfer robot 60 and then moved by the transfer robot.

As the container 9 is seated on the transfer robot 60, the tension applied by the load to the wire 12 of the winch 10 is relieved. The load measuring unit 53 may sense the reduced load, and the controller 50 may monitor the detection signal related to the load input from the load measuring unit, determine that the container is seated on the transfer robot, based on the reduced load, and then control the gripper 40 to release the grip on the container.

In detail, as the motor 47 of the driving unit 46 operates, the bolt shaft 48 rotates, the position of the at least one finger member 42 fixed to the nut portion 49 is changed due to the rotation of the bolt shaft, and the gap between the finger members is widened such that the grip on the container 9 may be released.

Alternatively, when the electromagnet is employed as the magnetic portion 30, the controller 50 may cut off the power applied to the magnetic portion.

Figure 3D:
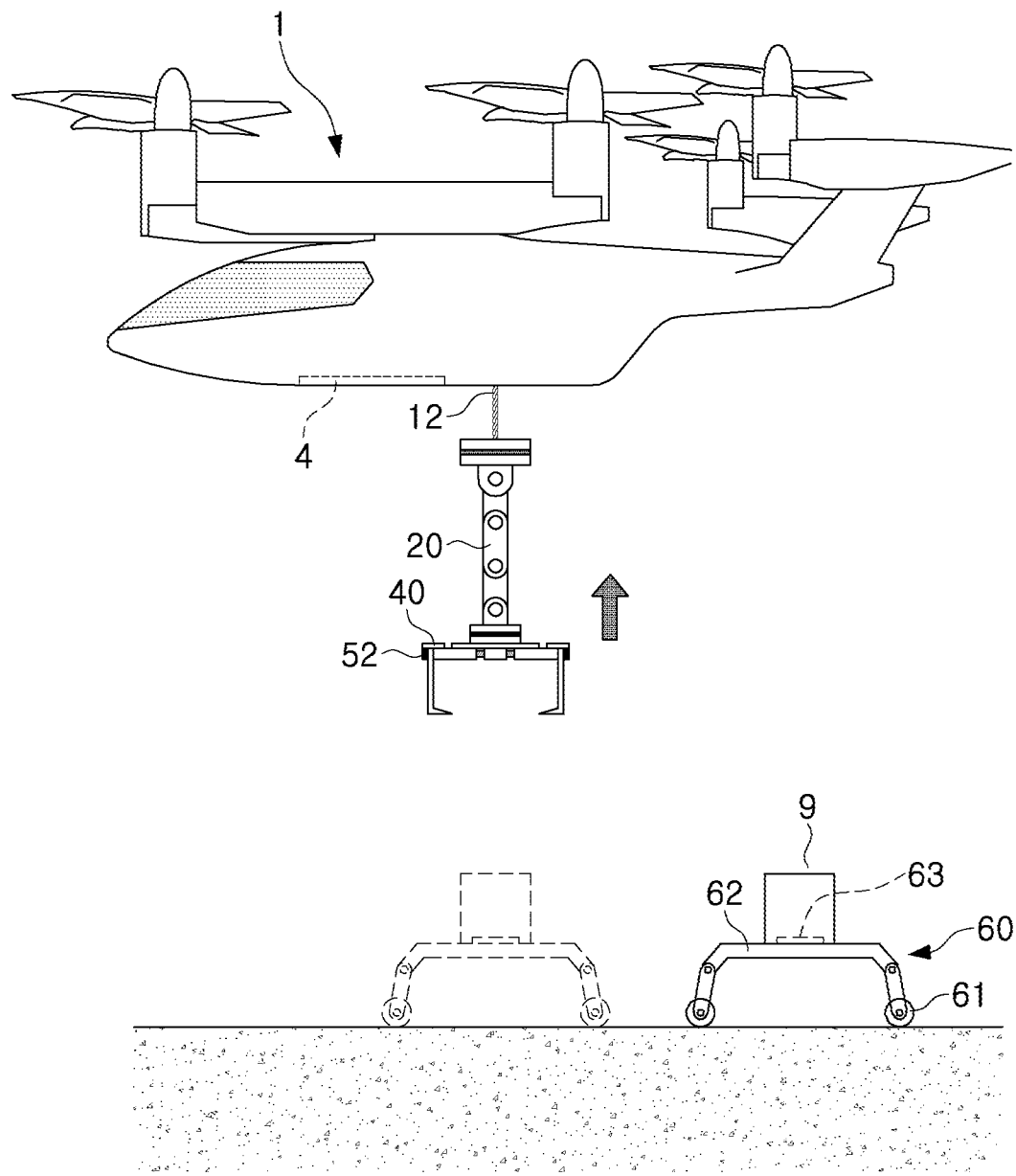

As illustrated in FIG. 3D, after the grip of the gripper 40 is released, the winch 10 may be operated under the control of the controller 50, and the multiarticulated robot arm 20 and the gripper 40 may be returned to the inside of the air mobility 1 through the open opening of the cargo hold 2.

In detail, as the motor 14 of the winch 10 operates, the drum 13 may rotate, and due to the rotation of the drum, the wire 12 may be wound around the drum. Accordingly, the multiarticulated robot arm 20 and the gripper 40 connected to the wire may ascend together.

When the wire 12 is completely wound up, a signal may be generated by abutting the upper surface of the support 15 with the limit switch 51 installed on the case of the winch 10 or the lower surface of the support bracket 11, and the controller 50 electrically connected to the limit switch may detect this signal and stop the operation of the winch to finish winding the wire.

After the door 4 of the cargo hold 2 is closed, the controller 50 of the air mobility 1 may control the air mobility such that it may operate toward the next destination. In addition, the transfer robot 60 on which the container 9 is loaded may autonomously drive and move toward the destination of the cargo.

As a result, the air mobility vehicle or system 1 may not land and the cargo may be automatically unloaded at a required location without the assistance of human resources.

The process of loading the container 9 from the transfer robot 60 into the cargo hold 2 of the air mobility vehicle or system 1 may be performed in the reverse order of the above-described unloading process.

In schematically illustrating only the different parts of the loading process, with the air mobility vehicle or system 1 remaining in the air of the destination and the door 4 being open, when the multiarticulated robot arm 20 and the gripper 40 of the apparatus for loading and unloading cargo descend from the air mobility, the finger members 42 of the gripper may be spread apart.

As the gripper 40 comes into contact with the container 9 on the transfer robot 60 located below the air mobility vehicle or system 1, the tension applied by the load to the wire 12 of the winch 10 may be relieved. The load measuring unit 53 may sense the reduced load, and the controller 50 may monitor the detection signal related to the load input from the load measuring unit, determine that the gripper has touched the container, based on the reduced load, and then control the gripper to grip the container.

In detail, as the motor 47 of the driving unit 46 operates, the bolt shaft 48 may rotate and as the position of the at least one finger member 42 fixed to the nut portion 49 is changed due to the rotation of the bolt shaft, and the distance between the finger members may be thus narrowed, thereby performing a grip on the container 9.

Alternatively, when the electromagnet is employed as the magnetic portion 30, the controller 50 may apply power to the magnetic portion to attach the magnetic portion to the container 9.

After the gripper 40 grips the container 9, the winch 10 may be operated under the control of the controller 50, and the multiarticulated robot arm 20, the gripper 40 and the container 9 may be lifted into the interior of the air mobility 1 through the open opening of the cargo hold 2.

In detail, as the motor 14 of the winch 10 operates, the drum 13 may rotate, and due to the rotation of the drum, the wire 12 may be wound around the drum, and thereby, the multiarticulated robot arm 20, the gripper 40 and the container 9 connected to the wire may ascend together.

At this time, the load sensor or torque sensor of the load measuring unit 53 may detect the load or torque applied to the multiarticulated robot arm 20 or the winch 10 by the container 9 and transmit the same to the controller 50, and the controller may measure or calculate the load of the container based on the detection signal.

When the wire 12 is fully wound up, a signal may be generated by abutting the upper surface of the support 15 with the limit switch 51 installed on the case of the winch 10 or the lower surface of the support bracket 11, and the controller 50 electrically connected to the limit switch may detect this signal and stop the operation of the winch to finish winding the wire.

After the door 4 of the cargo hold 2 is closed, the controller 50 of the air mobility vehicle or system 1 may control the operation of the multiarticulated robot arm by transmitting a command signal to the motors of the multiarticulated robot arm 20 according to the information related to the load of the container 9 and the set control logic. Under the control of the controller, the multiarticulated robot arm may dispose the container according to the load on the bottom plate 3 in the cargo hold.

In addition, when the controller 50 determines that the container is disposed in an appropriate position according to the detection signal related to the position of the corresponding container 9 in the cargo hold 2 by the image sensor 52, the controller 50 may control the gripper 40 to release the grip on the container.

Subsequently, after the multiarticulated robot arm 20 and the gripper 40 return to original positions thereof, the controller 50 may control the air mobility vehicle or system 1 to operate toward the next destination.

As set forth above, according to an exemplary embodiment, the cargo may be loaded and unloaded automatically in a required location without air mobility landing, improving convenience and efficiency of work. Further, the fuel economy of the air mobility vehicle or system may be increased, and the effect that cargo may be transported even in a relatively narrow area in which there is no take-off and landing area or on a ship may be obtained.

While example embodiments have been illustrated and described above, it will be apparent to those skilled in the art that modifications and variations could be made without departing from the scope of the present disclosure as defined by the appended claims.

What is claimed is:

1. An apparatus for loading and unloading cargo, the apparatus comprising:
   a winch configured to be installed in an air mobility vehicle; and
   a multiarticulated robot arm in communication with the winch and comprising a gripper provided capable of gripping a container,
   wherein the gripper comprises:
   a guide coupled to an end of the multiarticulated robot arm;
   a plurality of finger members, at least one of which reciprocates along the guide; and
   a driving unit connected to at least one reciprocating finger member and driving the finger member,
   wherein the driving unit comprises:
   a motor capable of forward and reverse rotation, and mounted on one side of the guide,
   a bolt shaft connected to the motor and rotated; and
   a nut portion engaged with the bolt shaft, and
   wherein a reciprocating finger member is fixedly connected to the nut portion.

2. The apparatus of claim 1, wherein the cargo hold has a bottom plate capable of being opened to allow entry and exit of the container, and
   wherein the winch is fixed to a ceiling in a position corresponding to an opening of the bottom plate.

3. The apparatus of claim 1, wherein the multiarticulated robot arm comprises at least a six-axis multiarticulated robot arm or a flexible multiarticulated robot arm.

4. The apparatus of claim 1, comprising a magnetic portion coupled to an end of the multiarticulated robot arm together with or instead of the gripper.

5. The apparatus of claim 1, wherein an end of the multiarticulated robot arm or the gripper is provided with an image sensor installed thereon, and
   wherein the image sensor is electrically connected to a controller.

6. The apparatus of claim 1, further comprising a load measuring unit sensing a load of the container,
   wherein the load measuring unit is electrically connected to a controller, and
   wherein the load measuring unit comprises a load sensor installed between an end of the multiarticulated robot arm and the gripper or a torque sensor installed on the winch.

7. An air mobility vehicle comprising an apparatus of claim 1.

8. An apparatus for loading and unloading cargo, the apparatus comprising:
   a winch configured to be installed in an air mobility vehicle;
   a multiarticulated robot arm in communication with the winch and comprising a gripper provided capable of gripping a container; and a transfer robot capable of loading the container thereon and movable on the ground, wherein a control unit of the transfer robot is capable of communicating with a controller of the air mobility, and wherein on an upper plate of the transfer robot, a protrusion inserted into and coupled to a concave groove in a lower surface of the container is formed.

9. A method of loading and unloading cargo, the method comprising:

hovering an air mobility vehicle without landing when the air mobility vehicle arrives at a destination of cargo loading or unloading;

moving a transfer robot toward the destination and positioning below the air mobility;

communicating between a control unit of the transfer robot and a controller of the air mobility;

descending a multiarticulated robot arm and a gripper from a cargo hold of the air mobility vehicle; and detecting a positional deviation between the gripper and the transfer robot, and correcting the positional deviation, wherein the method further comprises:

when unloading a container from the air mobility vehicle to the transfer robot, operating the multiarticulated robot arm to move the gripper toward the container to be unloaded;

operating the gripper to grip the container;

moving, by the multiarticulated robot arm, the gripper and the container toward a door of the cargo hold; and operating a winch after the door is opened, and lowering the multiarticulated robot arm, the gripper, and the container to an outside of the air mobility vehicle through an open opening of the cargo hold.

10. The method of claim 9, wherein in the correcting of the positional deviation, the positional deviation between the gripper and the transfer robot is detected by an image sensor, and the multiarticulated robot arm is operated or the transfer robot is moved through communication as much as the detected positional deviation.

11. The method of claim 9, further comprising:

monitoring a load applied to the multiarticulated robot arm or the winch and determining that the container is seated on the transfer robot; and actuating the gripper to release a grip on the container.

12. The method of claim 9, wherein, when the container is unloaded from the air mobility vehicle to the transfer robot, the container is disposed on an upper plate of the transfer robot while descending, and a protrusion formed on the upper plate of the transfer robot is inserted into a concave groove of the container.

13. The method of claim 9, further comprising:

when loading a container from the transfer robot to the air mobility, operating a winch after a door of the cargo hold is opened, and lowering the multiarticulated robot arm and the gripper to an outside of the air mobility vehicle through an open opening of the cargo hold;

monitoring a load applied to the multiarticulated robot arm or the winch, and determining that the gripper touches the container on the transfer robot; and operating the gripper to grip the container.

14. The method of claim 9, further comprising:

when loading a container from the transfer robot to the air mobility vehicle, lifting the multiarticulated robot arm, the gripper, and the container into the air mobility vehicle through an open opening of the cargo hold by operating a winch after the gripper grips the container on the transfer robot;

stopping an operation of the winch when a wire of the winch is completely wound up;

after a door of the cargo hold is closed, operating the multiarticulated robot arm to move the gripper and the container toward a position on which the container is to be loaded;

operating the gripper and releasing a grip on the container; and returning the multiarticulated robot arm and the gripper to original positions.

\* \* \* \* \*